US006556980B1

(12) United States Patent
Cheng (10) Patent No.: US 6,556,980 B1
(45) Date of Patent: Apr. 29, 2003

(54) MODEL-FREE ADAPTIVE CONTROL FOR INDUSTRIAL PROCESSES

(75) Inventor: George Shu-Xing Cheng, Folsom, CA (US)

(73) Assignee: General Cyberation Group, Inc., Rancho Cordova, CA (US)

(*) Notice: Subject to any disclaimer, the term of this patent is extended or adjusted under 35 U.S.C. 154(b) by 0 days.

(21) Appl. No.: 09/143,165

(22) Filed: Aug. 28, 1998

(51) Int. Cl.$^7$ ................................................ G06N 3/02
(52) U.S. Cl. ............................ 706/23; 706/14; 706/16; 706/25
(58) Field of Search ............................ 706/14, 23, 16, 706/25

(56) References Cited

U.S. PATENT DOCUMENTS

| | | | | |
|---|---|---|---|---|
| 5,159,660 A | * | 10/1992 | Lu et al. ..................... | 706/23 |
| 5,335,643 A | * | 8/1994 | Abate et al. ................. | 123/679 |
| 5,367,612 A | * | 11/1994 | Bozich et al. ................ | 706/23 |
| 5,486,996 A | * | 1/1996 | Samad et al. ................ | 364/152 |
| 5,498,943 A | * | 3/1996 | Kimoto et al. ............... | 318/601 |
| 5,513,098 A | * | 4/1996 | Spall et al. .................. | 364/158 |
| 5,517,418 A | * | 5/1996 | Green et al. .................. | 701/13 |
| 5,642,722 A | * | 7/1997 | Schumacher et al. ....... | 123/673 |
| 5,740,324 A | * | 4/1998 | Mathur et al. ............... | 706/16 |
| 5,781,700 A | * | 7/1998 | Puskorius et al. ........... | 706/14 |
| 5,992,383 A | * | 11/1999 | Scholten et al. ............. | 123/399 |

OTHER PUBLICATIONS

Kosko, Bart, Neural Networks and Fuzzy Systems, Prentice Hall, Englewood Cliffs, NJ, 1992.*

D.J. Myers et al., "Efficient Implementation of Piecewise Linear Activation Function for Digital VLSI Neural Networks," Electronic Letters, Nov. 23, 1989, vol. 25, No. 24, pp. 1662–1663.*

C. L. Phillips et al., Basic Feedback Control Systems, Alternate Second Edition, Prentice–Hall Inc., 1991, pp. 159–163.*

Y. Ogawara, "Feedback–Error–Learning Neural Network for the Automatic Maneuvering System of a Ship," Proceedings of the IEEE International Conference on Neural Networks, vol. 1, pp. 225–230, Dec. 1995.*

D. Gorinevsky et al., "Learning Approximation of Feedforward Control Dependence on the Task Parameters with Application to Direct–Drive Manipulator Tracking," IEEE Transactions on Robotics and Automation, vol. 13, No. 4, pp. 567–581, Aug. 1997.*

J. C. Spall et al., "Model–Free Control of General Discrete–Time Systems," Proceedings of the 32nd IEEE Conference on Decision and Control, vol. 3, pp. 2792–2797, Dec. 1993.*

C. Ha, "Integrated Flight/Propulsion Control System Design via Neural Network," Proceedings of the 1993 IEEE International Symposium on Intelligent Control, pp. 116–121, Aug. 1993.*

F.L. Lewis, "Neural Network Control of Robot Manipulators," IEEE Expert, vol. 11, No. 3, pp. 64–75, Jun. 1996.*

* cited by examiner

Primary Examiner—Wilbert L. Starks, Jr.
(74) Attorney, Agent, or Firm—Stout, Uxa, Buyan & Mullins, LLP (57) ABSTRACT

An enhanced model-free adaptive controller is disclosed, which consists of a linear dynamic neural network that can be easily configured and put in automatic mode to control simple to complex processes. Two multivariable model-free adaptive controller designs are disclosed. An enhanced anti-delay model-free adaptive controller is introduced to control processes with large time delays. A feedforward/feedback model-free adaptive control system with two designs is introduced to compensate for measurable disturbances.

18 Claims, 8 Drawing Sheets

MFA Anti-Delay Controller

MODEL-FREE ADAPTIVE CONTROL FOR INDUSTRIAL PROCESSES

FIELD OF THE INVENTION

The invention relates to industrial process control, and more particularly to an improved method and apparatus for model-free adaptive control of industrial processes using enhanced model-free adaptive control architecture and algorithms as well as feedforward compensation for disturbances.

BACKGROUND OF THE INVENTION

A Model-Free Adaptive Control methodology has been described in patent application Ser. No. 08/944,450 filed on Oct. 6, 1997. The methodology of that application, though effective and useful in practice, has some drawbacks as follows:

1. The model-free adaptive controller includes a nonlinear neural network which may cause saturation when the controller output is close to its upper or lower limits;
2. It is difficult for the user to specify a proper sample interval because it is related to the controller behavior;
3. Changing the controller gain in the absence of error may still cause a sudden change in controller output;
4. The prior multivariable model-free adaptive controller is quite complex and requires the presence of all sub-processes in the multi-input-multi-output process;
5. The static gain of the predictor in the prior anti-delay MFA controller is set at 1. It is better if the setting is related to the controller gain.
6. The time constant of the predictor in the prior anti-delay MFA controller is related to the setting of the sample interval. It is better if the setting is related to the process time constant;

SUMMARY OF INVENTION

The present invention overcomes the above-identified drawbacks of the prior art by providing model-free adaptive controllers using a linear dynamic neural network. The inventive controller also uses a scaling function to include the controller gain and user estimated process time constant. The controller gain can compensate for the process steady-state gain, and the time constant provides information of the dynamic behavior of the process. The setting for the sample interval becomes selectable through a wide range without affecting the controller behavior. Two more multivariable model-free adaptive controller designs (compensation method and prediction method) are disclosed. An enhanced anti-delay model-free adaptive controller is introduced to control processes with large time delays. The method to select the parameters for the anti-delay MFA predictor is disclosed. A feedforward/feedback model-free adaptive control system with two designs (compensation and prediction method) is used to compensate for measurable disturbances.

DESCRIPTION OF THE PREFERRED EMBODIMENTS

A. Single-variable Model-Free Adaptive Control

Figure 1:
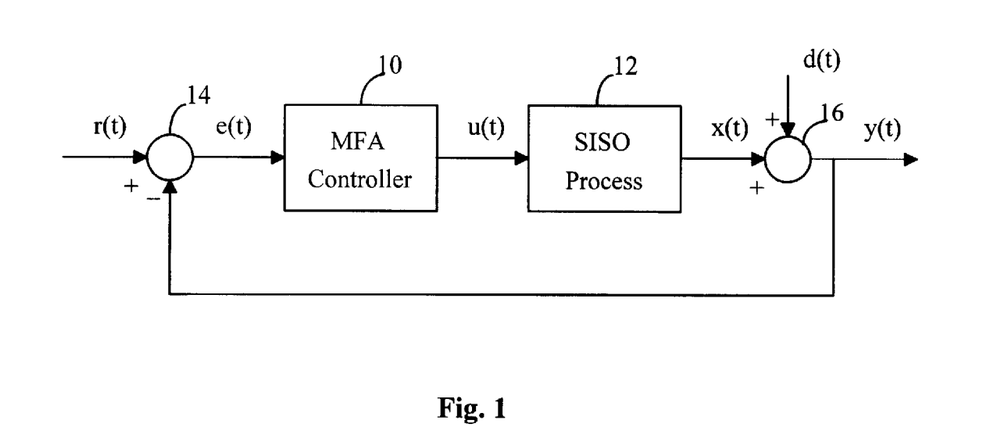
FIG. 1 is a block diagram illustrating a single-variable model-free adaptive control system according to this invention.

FIG. 1 illustrates a single variable model-free adaptive control system, which is the simplest form of this invention. The structure of the system is as simple as a traditional single loop control system, including a single-input-single-output (SISO) controller 10, a process 12, and signal adders, 14, 16. The signals shown in FIG. 1 are as follows:

r(t)—Setpoint y(t)—Measured Variable or the Process Variable, y(t)=x(t)+d(t).

x(t)—Process Output u(t)—Controller Output d(t)—Disturbance, the disturbance caused by noise or load changes.

e(t)—Error between the Setpoint and Measured Variable, e(t)=r(t)−y(t).

The control objective is to make the measured variable y(t) track the given trajectory of its setpoint r(t) under variations of setpoint, disturbance, and process dynamics. In other words, the task of the MFA controller is to minimize the error e(t) in an online fashion.

$$E_S(t) = \frac{1}{2}e(t)^2 \qquad (1)$$

$$= \frac{1}{2}[r(t) - y(t)]^2.$$

The minimization of $E_S(t)$ is done by adjusting the weighting factors in the MFA controller.

Figure 2:
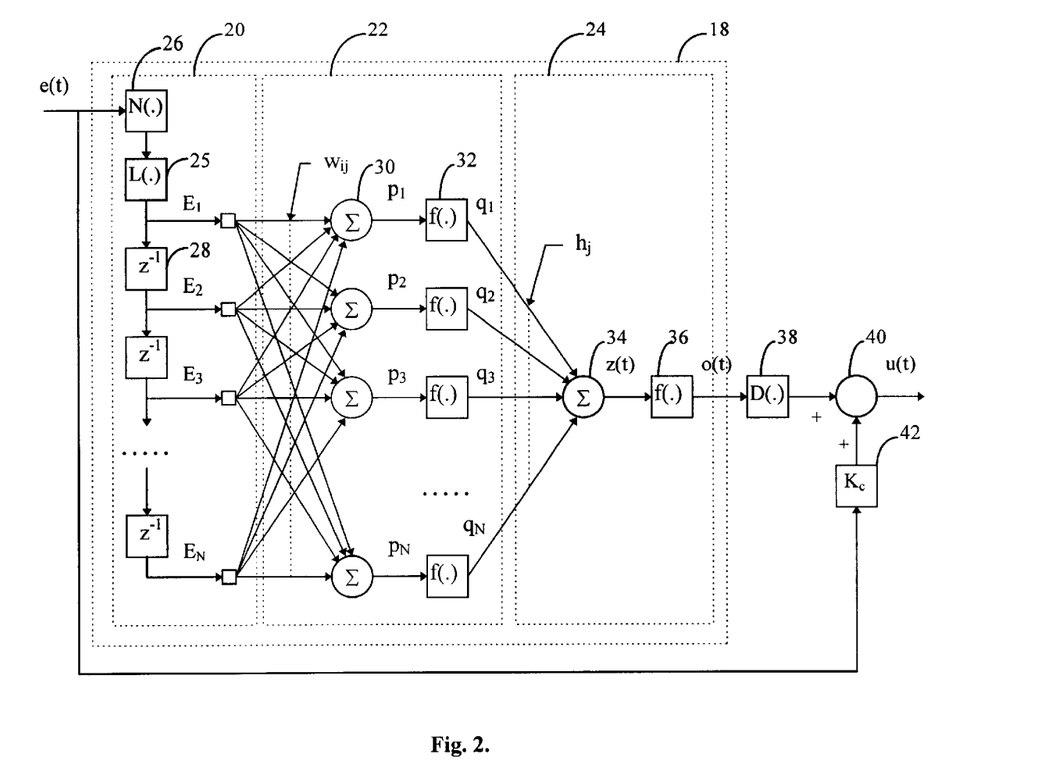
FIG. 2 is a block diagram illustrating the architecture of a single-variable model-free adaptive controller according to this invention.

FIG. 2 illustrates the architecture of a SISO MFA controller. A linear multilayer neural network 18 is used in the design of the controller. The neural network has one input layer 20, one hidden layer 22 with N neurons, and one output layer 24 with one neuron.

The input signal e(t) to the input layer 20 is firstly converted to a normalized error signal $E_1$ with a range of −1 to 1 by using the normalization unit 26, where N(.) denotes a normalization function. The output of the normalization unit 26 is then scaled by a scaling function L(.) 25:

$$L(.) = \frac{K_c}{T_c}. \quad (2)$$

The value of $E_1$ at time t is computed with function L(.) and N(.):

$$E_1 = \frac{K_c}{T_c} N(e(t)), \quad (3)$$

where $K_c > 0$ is defined as controller gain and $T_c$ is the user selected process time constant. These are important parameters for the MFA controller since $K_c$ is used to compensate for the process steady-state gain and $T_c$ provides information for the dynamic behavior of the process. When the error signal is scaled with these parameters, the controller's behavior can be manipulated by adjusting the parameters.

The use of $T_c$ as part of the scaling function permits a broad choice of sample intervals, $T_s$, because the only restriction is that $T_s$ must conform to the formula $T_s < T_c/3$ based on the principles of information theory.

The $E_1$ signal then goes iteratively through a series of delay units 28, where $z^{-1}$ denotes the unit delay operator. A set of normalized and scaled error signals $E_2$ to $E_N$ is then generated. In this way, a continuous signal e(t) is converted to a series of discrete signals, which are used as the inputs to the neural network. These delayed error signals $E_i$, i=1, ... N, are then conveyed to the hidden layer through the neural network connections. This is equivalent to adding a feedback structure to the neural network. Then the regular static multilayer neural network becomes a dynamic neural network, which is a key component for the model-free adaptive controller.

A model-free adaptive controller requires a dynamic block such as a dynamic neural network as its key component. A dynamic block is just another name for a dynamic system, whose inputs and outputs have dynamic relationships.

Each input signal is conveyed separately to each of the neurons in the hidden layer 22 via a path weighted by an individual weighting factor we, where i=1, 2, ... N, and j=1, 2, ... N. The inputs to each of the neurons in the hidden layer are summed by adder 30 to produce signal $p_j$. Then the signal $p_j$ is filtered by an activation function 32 to produce $q_j$, where j denotes the jth neuron in the hidden layer.

A piecewise continuous linear function f(x) mapping real numbers to [0,1] defined by $$f(x)=0, \text{ if } x<-b/a \quad (4a)$$

$$f(x)=ax+b, \text{ if } -b/a \leq x \leq b/a \quad (4b)$$

$$f(x)=1, \text{ if } x>b/a \quad (4c)$$

where preferably a>0, and b>0, is used as the activation function in the neural network. The constants of the activation function can be selected quite arbitrarily. The reason for using a linear function f(x) to replace the conventional sigmoidal function is that the linear activation function will not cause saturation near the limits as the sigmoidal function may do.

Each output signal from the hidden layer is conveyed to the single neuron in the output layer 24 via a path weighted by an individual weighting factor $h_j$, where j=1, 2, ... N. These signals are summed in adder 34 to produce signal z(.), and then filtered by activation function 36 to produce the output o(.) of the neural network 18 with a range of 0 to 1.

A de-normalization function 38 defined by $$D(x)=100x, \quad (5)$$

maps the o(.) signal back into the real space to produce the controller output u(t).

The algorithm governing the input-output of the controller consists of the following difference equations:

$$p_j(n) = \sum_{i=1}^{N} w_{ij}(n) E_i(n), \quad (6)$$

$$o(n) = f\left(\sum_{j=1}^{N} h_j(n) q_j(n)\right), \quad (8)$$

$$= a \sum_{j=1}^{N} h_j(n) q_j(n) + b,$$

when the variable of function f(.) is in the range specified in Equation (4b), and o(n) is bounded by the limits specified in Equations (4a) and (4c). The controller output becomes $$u(t) = K_c e(t) + D(o(t)) \quad (9)$$

$$= K_c e(t) + 100 \left[ a \sum_{j=1}^{N} h_j(n) q_j(n) + b \right],$$

where n denotes the nth iteration; o(t) is the continuous function of o(n); u(t) is the output of the MFA controller; D(.) is the de-normalization function; and $K_c > 0$, called controller gain 42, is a constant used to adjust the magnitude of the controller. This is the same constant as in the scaling function L(.) 25 and is useful to fine tune the controller performance or keep the system in a stable range.

An online learning algorithm is developed to continuously update the values of the weighting factors of the MFA controller as follows:

$$\Delta w_{ij}(n) = a^2 \eta \frac{\partial y(n)}{\partial u(n)} e(n) E_i(n) h_j(n), \quad (10)$$

$$\Delta h_j(n) = a \eta \frac{\partial y(n)}{\partial u(n)} e(n) q_j(n), \quad (11)$$

where preferably η>0 is the learning rate, and the partial derivative ∂y(n)/∂u(n) is the gradient of y(t) with respect to u(t), which represents the sensitivity of the output y(t) to variations of the input u(t).

By selecting $$\frac{\partial y(t)}{\partial u(t)} = S_f(n) = 1, \quad (12)$$

as described in patent application Ser. No. 08/944,450, the resulting learning algorithm is as follows:

$$\Delta w_{ij}(n) = a^2 \eta e(n) E_i(n) h_j(n), \quad (13)$$

$$\Delta h_j(n) = a \eta e(n) q_j(n). \quad (14)$$

The equations (1) through (14) work for both process direct-acting or reverse acting types. Direct-acting means that an increase in the process input will cause its output to increase, and vice versa. Reverse-acting means that an increase in the process input will cause its output to decrease, and vice versa. To keep the above equations working for both direct and reverse acting cases, e(t) needs to be calculated differently based on the acting type of the process as follows:

$$e(t) = r(t) - y(t), \text{ if direct acting} \tag{15a}$$

$$e(t) = -[r(t) - y(t)], \text{ if reverse acting} \tag{15b}$$

This is a general treatment for the process acting types. It applies to all model-free adaptive controllers to be introduced below.

B. Multivariable Model-Free Adaptive Control

Figure 3:
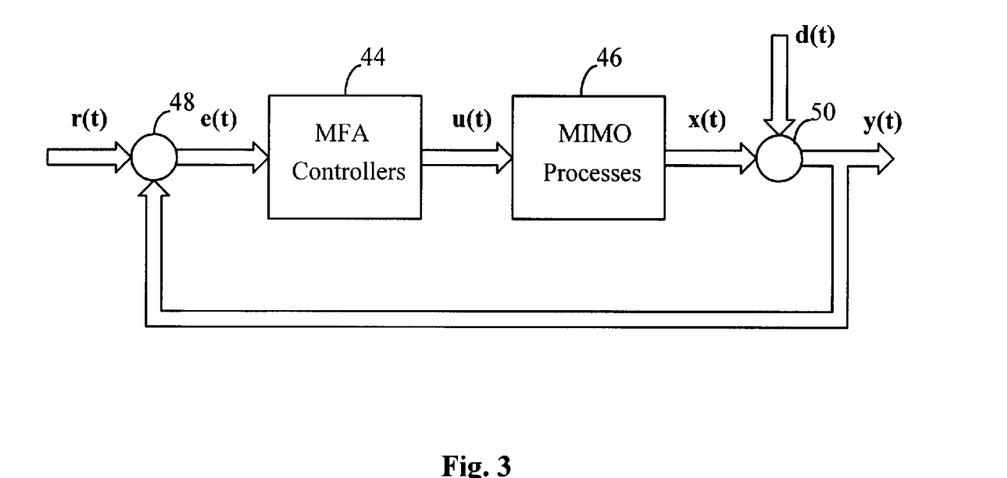
FIG. 3 is a block diagram illustrating a multivariable model-free adaptive control system according to this invention.

FIG. 3 illustrates a multivariable feedback control system with a model-free adaptive controller. The system includes a set of controllers 44, a multi-input multi-output (MIMO) process 46, and a set of signal adders 48 and 50, respectively, for each control loop. The inputs e(t) to the controller are presented by comparing the setpoints r(t) with the measured variables y(t), which are the process responses to controller outputs u(t) and the disturbance signals d(t). Since it is a multivariable system, all the signals here are vectors represented in bold case as follows.

$$r(t) = [r_1(t), r_2(t), \ldots, r_M(t)]^T, \tag{16a}$$

$$e(t) = [e_1(t), e_2(t), \ldots, e_M(t)]^T, \tag{16b}$$

$$u(t) = [u_1(t), u_2(t), \ldots, u_M(t)]^T, \tag{16c}$$

$$y(t) = [y_1(t), y_2(t), \ldots, y_M(t)]^T, \tag{16d}$$

$$d(t) = [d_1(t), d_2(t), \ldots, d_M(t)]^T, \tag{16e}$$

where superscript T denotes the transpose of the vector, and subscript M denotes the total element number of the vector.

There are three methods to construct a multivariable model-free adaptive control system: decoupling, compensation, and prediction. The decoupling method is described in patent application Ser. No. 08/944,450, and other two methods are introduced in the following.

1. Compensation Method

Figure 4:
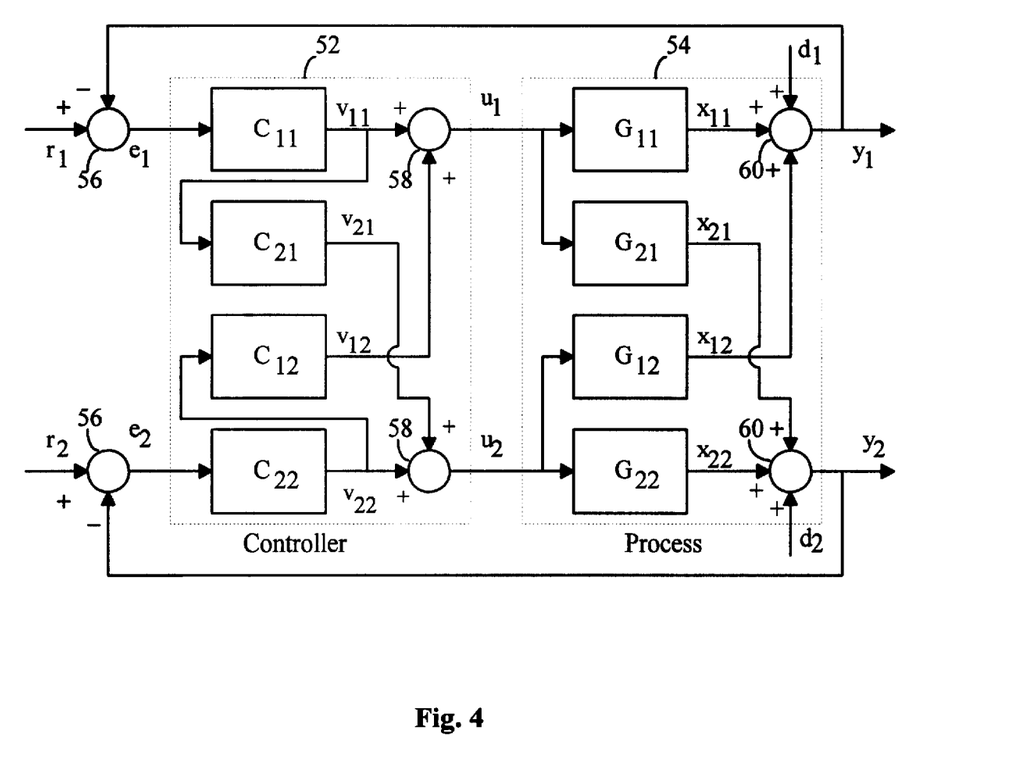
FIG. 4 is a block diagram illustrating a 2×2 multivariable model-free control system according to this invention.

Without losing generality, we will show how a multivariable model-free adaptive control system works with a 2-input-2-output (2×2) system as illustrated in FIG. 4, which is the 2×2 arrangement of FIG. 3. In the 2×2 MFA control system, the MFA controller set 52 consists of two controllers $C_{11}$, $C_{22}$, and two compensators $C_{21}$, and $C_{12}$. The process 54 has four sub-processes $G_{11}$, $G_{21}$, $G_{12}$, and $G_{22}$.

The process outputs as measured variables $y_1$ and $y_2$ are used as the feedback signals of the main control loops. They are compared with the setpoints $r_1$ and $r_2$ at adders 56 to produce errors e1 and $e_2$. The output of each controller associated with one of the inputs $v_{11}$ or $v_{22}$ is combined with the output of the compensator associated with the other input by adders 58 to produce control signals $u_1$ and $u_2$. The output of each sub-process is cross added by adders 60 to produce measured variables $y_1$ and $y_2$. Notice that in real applications the outputs from the sub-processes are not measurable and only their combined signals $y_1$ and $y_2$ can be measured. Thus, by the nature of the 2×2 process, the inputs $u_1$ and $u_2$ to the process are interconnected with its outputs $y_1$ and $y_2$. The change in one input will cause both outputs to change.

In this 2×2 system, the element number M in Equation 16 equals to 2 and the signals shown in FIG. 4 are as follows:

$r_1(t)$, $r_2(t)$—Setpoint of controllers $C_{11}$ and $C_{22}$, respectively.

$e_1(t)$, $e_2(t)$—Error between the setpoint and measured variable.

$v_{11}(t)$, $v_{22}(t)$—Output of controller $C_{11}$ and $C_{22}$, respectively.

$v_{21}(t)$, $v_{12}(t)$—Output of compensators $C_{21}$ and $C_{12}$, respectively.

$u_1(t)$, $u_2(t)$—Inputs to the process, or the outputs of the 2×2 controller set.

$x_{11}(t)$, $x_{21}(t)$, $x_{12}(t)$, $x_{22}(t)$—Output of process $G_{11}$, $G_{21}$, $G_{12}$ and $G_{22}$, respectively.

$d_1(t)$, $d_2(t)$—Disturbance to $y_1$ and $y_2$, respectively.

$y_1(t)$, $y_2(t)$—Measured Variables of the 2×2 process.

The relationship between these signals are as follows:

$$e_1(t) = r_1(t) - y_1(t) \tag{17a}$$

$$e_2(t) = r_2(t) - y_2(t) \tag{17b}$$

$$y_1(t) = x_{11}(t) + x_{12}(t) \tag{17c}$$

$$y_2(t) = x_{21}(t) + x_{22}(t) \tag{17d}$$

$$u_1(t) = v_{11}(t) + v_{12}(t) \tag{17e}$$

$$u_2(t) = v_{21}(t) + v_{22}(t) \tag{17f}$$

The controllers $C_{11}$ and $C_{22}$ have the same structure as the SISO MFA controller shown in FIG. 2. The input and output relationship in these controllers is represented by the following equations:

For Controller $C_{11}$:

$$p_j^{11}(n) = \sum_{i=1}^{N} w_{ij}^{11}(n) E_i^{11}(n), \tag{18}$$

$$q_j^{11}(n) = a p_j^{11}(n) + b, \tag{19}$$

$$v_{11}(n) = K_c^{11} e_1(n) + 100 \left[ a \sum_{j=1}^{N} h_j^{11}(n) q_j^{11}(n) + b \right], \tag{20}$$

$$\Delta w_{ij}^{11}(n) = a^2 \eta^{11} e_1(n) E_i^{11}(n) h_j^{11}(n), \tag{21}$$

$$\Delta h_j^{11}(n) = a \eta^{11} e_1(n) q_j^{11}(n), \tag{22}$$

For Controller $C_{22}$ $$p_j^{22}(n) = \sum_{i=1}^{N} w_{ij}^{22}(n) E_i^{22}(n), \tag{23}$$

$$q_j^{22}(n) = a p_j^{22}(n) + b, \tag{24}$$

$$v_{22}(n) = K_c^{22} e_2(n) + 100 \left[ a \sum_{j=1}^{N} h_j^{22}(n) q_j^{22}(n) + b \right], \tag{25}$$

$$\Delta w_{ij}^{22}(n) = a^2 \eta^{22} e_2(n) E_i^{22}(n) h_j^{22}(n), \tag{26}$$

$$\Delta h_j^{22}(n) = a \eta^{22} e_2(n) q_j^{22}(n). \tag{27}$$

In these equations, preferably $\eta > 0$ and $\eta > 0$ are the learning rate; $K_c^{11} > 0$ and $K_c^{22} > 0$ are the controller gain for $C_{11}$ and $C_{22}$, respectively; and $T_c^{11} > 0$ and $T_c^{22} > 0$ are estimated process time constants for $G_{11}$ and $G_{22}$, respectively. $E_i^{11}(n)$ is the delayed and scaled error signal of $e_1(n)$; and $E_i^{22}(n)$ is the delayed and scaled error signal of $e_2(n)$.

The compensators $C_{12}$ and $C_{21}$ can be designed to include a first-order dynamic block by the following Laplace transfer functions:

For Compensator $C_{21}$ $$C_{21}(S) = \frac{V_{21}(S)}{V_{11}(S)} \tag{28}$$

$$= \frac{K_s^{21} K_c^{21}}{T_c^{21} S + 1}.$$

For Compensator $C_{12}$ $$C_{12}(S) = \frac{V_{12}(S)}{V_{22}(S)} \tag{29}$$

$$= \frac{K_s^{12} K_c^{12}}{T_c^{12} S + 1}.$$

In these equations, $V_{11}(S)$, $V_{21}(S)$, $V_{12}(S)$, and $V_{22}(S)$ are the Laplace transform of signals $v_{11}(t)$, $v_{21}(t)$, $v_{12}(t)$, and $v_{22}(t)$, respectively; S is the Laplace transform operator; $K_c^{21}>0$ and $K_c^{12}>0$ are the compensator gain; and $T_c^{21}$ and $T_c^{12}$ are the compensator time constants, for $C_{21}$ and $C_{12}$, respectively. In the applications where only static compensation is considered, $T_c^{21}$ and $T_c^{12}$ can be set to 0. If the sub-process $G_{21}=0$, meaning that there is no interconnection from loop 1 to loop 2, the compensator $C_{21}$ should be disabled by selecting $K_c^{21}=0$. Similarly, if $G_{12}=0$, one should select $K_{12}=0$ to disable $C_{12}$.

The compensator sign factors $K_s^{21}$ and $K_s^{12}$ are a set of constants relating to the acting types of the process as follows:

$K_s^{21}=1$, if $G_{22}$ and $G_{21}$ have different acting types (30a)

$K_s^{21}=-1$, if $G_{22}$ and $G_{21}$ have the same acting type (30b)

$K_s^{12}=1$, if $G_{11}$ and $G_{12}$ have different acting types (30c)

$K_s^{12}=-1$, if $G_{11}$ and $G_{12}$ have the same acting type (30d)

These sign factors are needed to assure that the MFA compensators produce signals in the correct direction so that the disturbances caused by the coupling factors of the multivariable process can be reduced.

Figure 5:
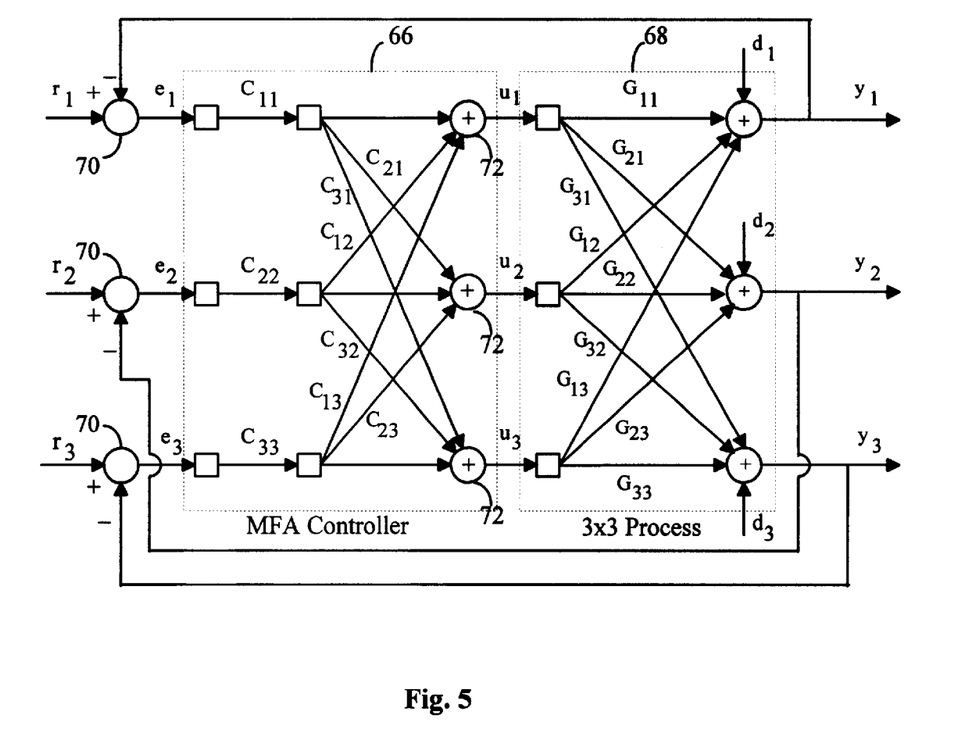
FIG. 5 is a signal flow diagram illustrating a 3×3 multivariable model-free adaptive control system according to this invention.

A 3×3 multivariable model-free adaptive control system is illustrated in FIG. 5 with a signal flow diagram. In the 3×3 MFA control system, the MFA controller set 66 consists of three controllers $C_{11}$, $C_{22}$, $C_{33}$, and six compensators $C_{21}$, $C_{31}$, $C_{12}$, $C_{32}$, $C_{13}$, $C_{23}$. The process 68 has nine sub-processes $G_{11}$ through $G_{33}$. The process outputs as measured variables $y_1$, $y_2$, and $y_3$ are used as the feedback signals of the main control loops. They are compared with the setpoints $r_1$, $r_2$, and $r_3$ at adders 70 to produce errors $e_1$, $e_2$, and $e_3$. The output of each controller associated with one of the inputs $e_1$, $e_2$, or $e_3$ is combined with the output of the compensators associated with the other two inputs by adders 72 to produce control signals $u_1$, $u_2$, and $u_3$.

Without losing generality, a set of equations that apply to an arbitrary M×M multivariable model-free adaptive control system is given in the following. If M=3, it applies to the above-stated 3×3 MFA control system.
For Controller $C_{ll}$:

$$p_j^{ll}(n) = \sum_{i=1}^{N} w_{ij}^{ll}(n) E_i^{ll}(n), \tag{31}$$

$$q_j^{ll}(n) = a p_j^{ll}(n) + b, \tag{32}$$

$$v_{ll}(n) = K_c^{ll} e_l(n) + 100 \left[ a \sum_{j=1}^{N} h_j^{ll}(n) q_j^{ll}(n) + b \right], \tag{33}$$

$$\Delta w_{ij}^{ll}(n) = a^2 \eta^{ll} e_l(n) E_i^{ll}(n) h_j(n), \tag{34}$$

$$\Delta h_j^{ll}(n) = a \eta^{ll} e_l(n) q_j^{ll}(n), \tag{35}$$

$$u_l(n) = v_{ll}(n) + \sum_{m=1}^{M} v_{lm}(n), \tag{36}$$

where l=1, 2, . . . M, m=1, 2, . . . M; and l≠m.
For Compensator $C_{lm}$ $$C_{lm}(S) = \frac{V_{lm}(S)}{V_{mm}(S)} \tag{37}$$

$$= \frac{K_s^{lm} K_c^{lm}}{T_c^{lm} S + 1},$$

where l=1, 2, . . . M; m=1, 2, . . . M; and l≠m.

In the equation, $V_{lm}(S)$ and $V_{mm}(S)$ are the Laplace transform of signals $v_{lm}(t)$ and $v_{mm}(t)$, respectively; S is the Laplace transform operator; $K_c^{lm}>0$ is the compensator gain; and $T_c^{lm}$ is the compensator time constant. $K_s^{lm}$ is the compensator sign factor, which is selected based on the acting types of the sub-processes as follows:

$K_s^{lm}=1$, if $G_{ll}$ and $G_{lm}$ have different acting types (38a)

$K_s^{lm}=-1$, if $G_{ll}$ and $G_{lm}$ have the same acting type (38b)

where l=1, 2, . . . M; m=1, 2, . . . M; and l≠m.
2. Prediction Method

Figure 6:
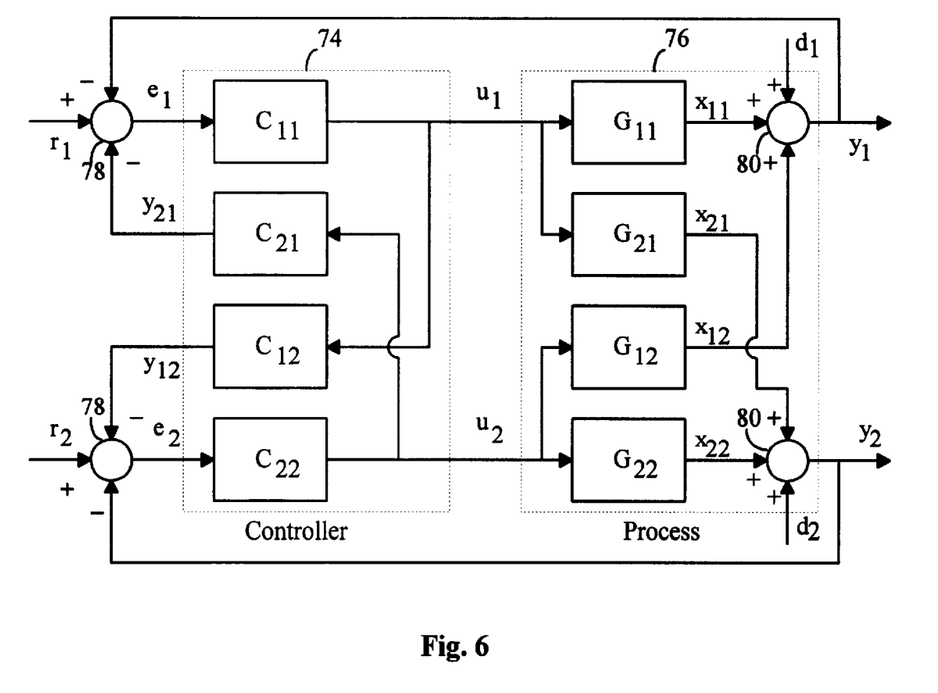
FIG. 6 is a block diagram illustrating a 2×2 predictive multivariable model-free control system according to this invention.

As illustrated in FIG. 6, a 2×2 predictive MFA controller set 74 consists of two controllers $C_{11}$, $C_{22}$, and two predictors $C_{21}$, and $C_{12}$. The process 76 has four sub-processes $G_{11}$, $G_{21}$, $G_{12}$, and $G_{22}$.

The process outputs as measured variables $y_1$ and $y_2$ are used as the feedback signals of the main control loops. They are compared with the setpoints $r_1$ and $r_2$ and predictor outputs $y_{21}$ and $y_{12}$, respectively, at adders 78 to produce errors $e_1$ and $e_2$. The output of each controller is used as the input of the predictor that connects to the other main loop. The output of each sub-process is cross added by adders 80 to produce measured variables $y_1$ and $y_2$.

In this 2×2 system, the signals shown in FIG. 6 are as follows:

$r_1(t)$, $r_2(t)$—Setpoint of controllers $C_{11}$ and $C_{22}$, respectively.

$e_1(t)$, $e_2(t)$—Error between the setpoint and measured variable as modified by the predictor outputs $y_{21}$ and $y_{12}$, respectively.

$u_1(t)$, $u_2(t)$—Output of controller $C_{11}$ and $C_{22}$, respectively.

$y_{21}(t)$, $y_{12}(t)$—Output of predictors $C_{21}$, and $C_{12}$, respectively.

$x_{11}(t)$, $x_{21}(t)$, $x_{12}(t)$, $x_{22}(t)$—Output of process $G_{11}$, $G_{21}$, $G_{12}$ and $G_{22}$, respectively.

$d_1(t)$, $d_2(t)$—Disturbance to $y_1$ and $y_2$, respectively.

$y_1(t)$, $y_2(t)$—Measured Variables of the 2×2 process.
The relationship between these signals are as follows:

$$e_1(t) = r_1(t) - y_1(t) - y_{21}(t) \tag{39a}$$

$$e_2(t) = r_2(t) - y_2(t) - y_{12}(t) \tag{39b}$$

$$y_1(t)=x_{11}(t)+x_{12}(t) \quad (39c)$$

$$y_2(t)=x_{21}(t)+x_{22}(t) \quad (39d)$$

The controllers $C_{11}$ and $C_{22}$ have the same structure as the SISO MFA controller shown in FIG. 2. The input and output relationship in these controllers is the same as presented in Equations (18) to (27), except that the controller outputs are now $u_1$ and $u_2$ instead of $v_{11}$ and $v_{22}$.

For Controller $C_{11}$ $$u_1(n) = K_c^{11} e_1(n) + 100 \left[ a \sum_{j=1}^{N} h_j^{11}(n) q_j^{11}(n) + b \right], \quad (40)$$

For Controller $C_{22}$ $$u_2(n) = K_c^{22} e_2(n) + 100 \left[ a \sum_{j=1}^{N} h_j^{22}(n) q_j^{22}(n) + b \right]. \quad (41)$$

The predictors $C_{12}$ and $C_{21}$ can be designed to include a first-order dynamic block by the following Laplace transfer functions:

For Predictor $C_{21}$ $$C_{21}(S) = \frac{Y_{21}(S)}{U_2(S)} \quad (42)$$

$$= K_s^{21} K_c^{21} \left( 1 - \frac{1}{T_c^{21} S + 1} \right).$$

For Predictor $C_{12}$ $$C_{12}(S) = \frac{Y_{12}(S)}{U_1(S)} \quad (43)$$

$$= K_s^{12} K_c^{12} \left( 1 - \frac{1}{T_c^{12} S + 1} \right).$$

In these equations, $U_1(S)$, $U_2(S)$, $Y_{21}(S)$, and $Y_{12}(S)$ are the Laplace transform of signals $u_1(t)$, $u_2(t)$, $y_{21}(t)$, and $y_{12}(t)$, respectively; S is the Laplace transform operator; $K_c^{21}>0$ and $K_c^{12}>0$ are the predictor gain, and $T_c^{21}$ and $T_c^{12}$ are the predictor time constants, for $C_{21}$ and $C_{12}$, respectively. The predictive signals will allow the MFA controllers to make corrective adjustments based on the changes in its input to compensate for the coupling factors from the other loop. The predictive signals will quickly decay to 0 based on the predictor time constant. This design will not cause a bias at the controller input and output.

The predictor sign factors $K_s^{21}$ and $K_s^{12}$ are a set of constants relating to the acting types of the process as follows:

$K_s^{21}=1$, if $G_{12}$ is direct acting (44a)

$K_s^{21}=-1$, if $G_{12}$ is reverse acting (44b)

$K_s^{12}=1$, if $G_{21}$ is direct acting (44c)

$K_s^{12}=-1$, if $G_{21}$ is reverse acting (44d)

These sign factors are needed to assure that the MFA predictors produce signals in the correct direction so that the disturbances caused by the coupling factors of the multivariable process can be reduced.

Figure 7:
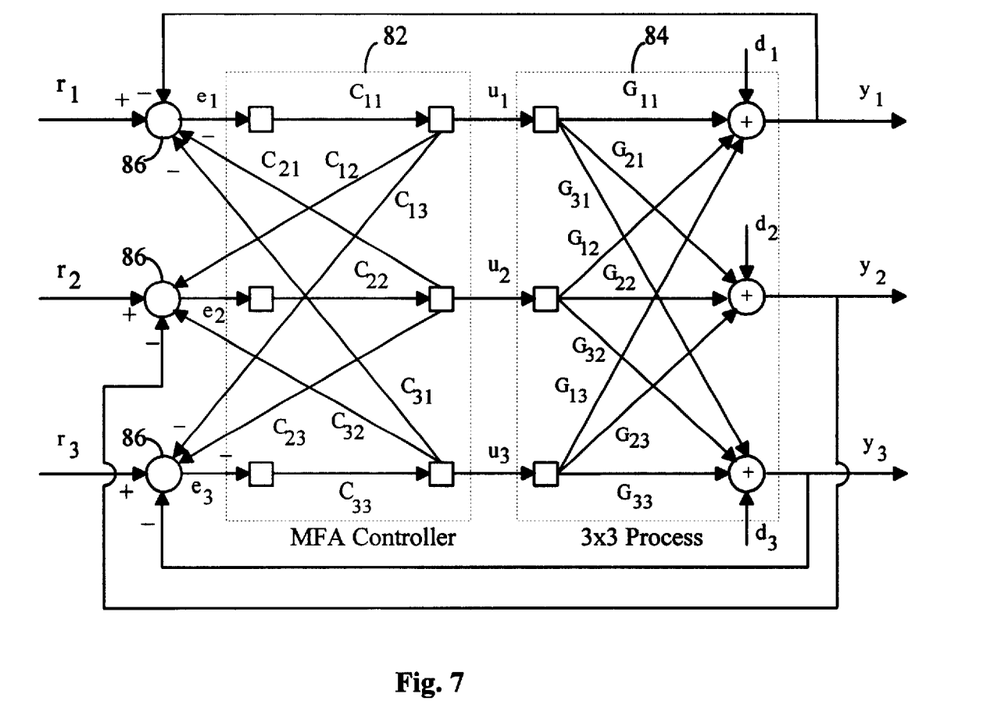
FIG. 7 is a signal flow diagram illustrating a 3×3 predictive multivariable model-free adaptive control system according to this invention.

A 3×3 multivariable model-free adaptive control system is illustrated in FIG. 7 with a signal flow chart. In the 3×3 MFA control system, the MFA controller set 82 consists of three controllers $C_{11}$, $C_{22}$, $C_{33}$, and six predictors $C_{21}$, $C_{31}$, $C_{12}$, $C_{32}$, $C_{13}$, $C_{23}$. The process 84 has nine sub-processes $G_{11}$ through $G_{33}$. The process outputs as measured variables $y_1$, $y_2$, and $y_3$ are used as the feedback signals of the main control loops. They are compared with the setpoints $r_1$, $r_2$, $r_3$ and related predictor outputs $y_{21}$, $y_{31}$, $y_{12}$, $y_{32}$, $y_{13}$, and $y_{23}$, respectively, at adders 86 to produce errors $e_1$, $e_2$, and $e_3$. The output of each controller is used as the input of the predictor that connects to the other main loops.

Without losing generality, a set of equations that apply to an arbitrary M×M multivariable model-free adaptive control system is given in the following. If M=3, it applies to the above-stated 3×3 MFA control system.

For Controller $C_{ll}$ $$u_l(n) = K_c^{ll} e_l(n) + 100 \left[ a \sum_{j=1}^{N} h_j^{ll}(n) q_j^{ll}(n) + b \right], \quad (45)$$

where l=1, 2, . . . M.
For Predictor $C_{lm}$ $$C_{lm}(S) = \frac{Y_{lm}(S)}{U_l(S)} \quad (46)$$

$$= K_s^{lm} K_c^{lm} \left( 1 - \frac{1}{T_c^{lm} S + 1} \right),$$

where l=1, 2, . . . M; m=1, 2, . . . M; and l≠m.

In the equation, $Y_{lm}(S)$ and $U_l(S)$ are the Laplace transform of signals $y_{lm}(t)$ and $u_l(t)$, respectively; S is the Laplace transform operator; $K_c^{lm}>0$ is the predictor gain, $T_c^{lm}$ is the predictor time constant, and $K_s^{lm}$ is the predictor sign factor, which is selected based on the acting types of the sub-processes as follows:

$K_s^{lm}=1$, if $G_{ml}$ is direct acting (47a)

$K_s^{lm}=-1$, if $G_{ml}$ is reverse acting (47b)

where l=1, 2, . . . M; m=1, 2, . . . M; and l≠m.

C. Anti-Delay Model-Free Adaptive Control

Figure 8:
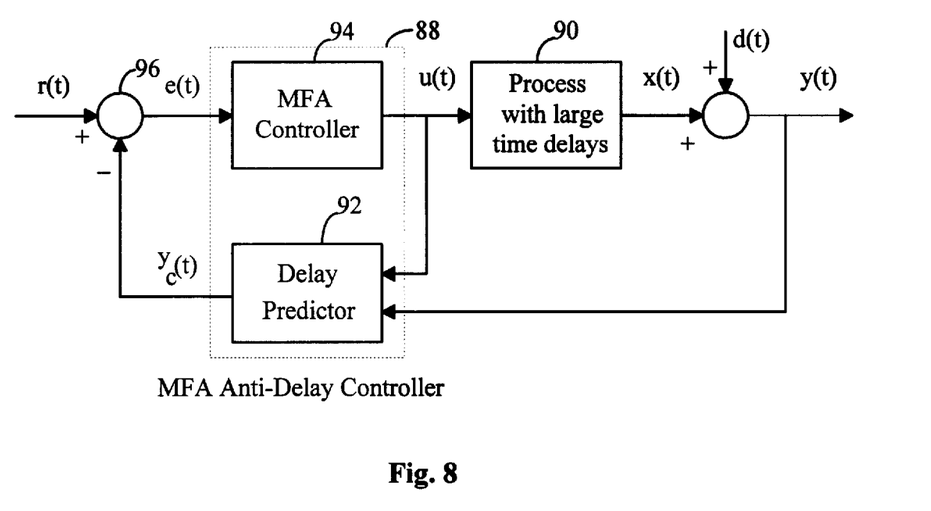
FIG. 8 is a block diagram illustrating a SISO model-free adaptive anti-delay control system according to this invention.

Model-Free Adaptive Control for processes with large time delays was described in patent application Ser. No. 08/944,450 filed on Oct. 6, 1997. As illustrated in FIG. 8, a SISO anti-delay model-free adaptive control system consists of an MFA anti-delay controller 88, a process with large time delays 90, and a special delay predictor 92. The above-stated MFA controller can be used as the basic MFA controller 94 in the anti-delay MFA control system.

The input to controller 94 is calculated through adder 96 as $$e(t)=r(t)-y_c(t) \quad (48)$$

The delay predictor can be designed in a generic first-order-lag-plus-delay form represented by the following Laplace transfer function:

$$Y_c(S) = Y(S) + Y_p(S) \quad (49)$$

$$= Y(S) + \frac{K(1 - e^{-\tau S})}{TS + 1} U(S),$$

where $Y(S)$, $Y_p(S)$, $U(S)$, and $Y_c(S)$ are the Laplace transform of signals $y(t)$, $y_p(t)$, $u(t)$ and $y_c(t)$, respectively; $y_p(t)$ is the predictive signal; $y_c(t)$ is the output of the predictor; K, T, τ are the predictor parameters.

The technique for setting these parameters is described in the following:

The process DC gain can be set as $$K = \frac{1}{K_c}, \tag{50}$$

where $K_c$ is the MFA controller gain as described in Equation (3).

The predictor time constant can be selected as $$T = T_c, \tag{51}$$

where $T_c$ is the estimated process time constant as described in Equation (3).

The process delay time τ is set based on a rough estimation of process delay time provided by the user.

The technique for setting the anti-delay MFA predictor parameters can also be used in the multivariable version of the anti-delay MFA controller.

D. Feedforward Model-Free Adaptive Control

Feedforward is a control scheme to take advantage of forward signals. If a process has a significant potential disturbance, and the disturbance can be measured, we can use a feedforward controller to reduce the effect of the disturbance to the loop before the feedback loop takes corrective action. If a feedforward controller is used properly together with a feedback controller, it can improve the control performance significantly.

Figure 9:
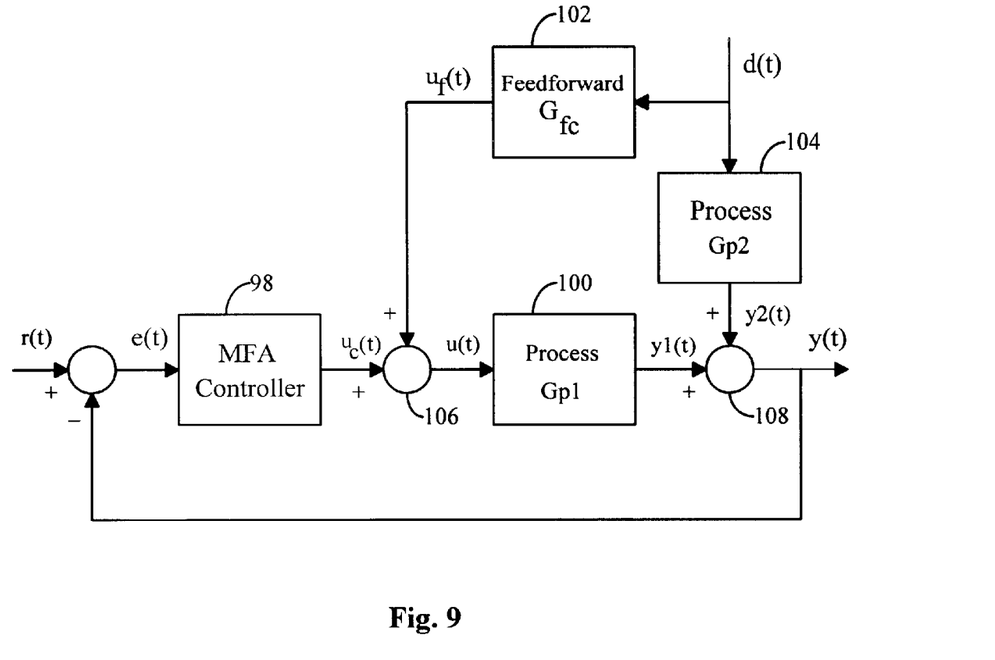
FIG. 9 is a block diagram illustrating a feedforward/feedback model-free adaptive control system according to this invention.

FIG. 9 illustrates a Feedforward-Feedback control system. The control signal u(t) is a combination of the feedback controller output $u_c(t)$ and the feedforward controller output $u_f(t)$ at adder 106. The measured variable y(t) is a combination of the output $y_1(t)$ of the process $G_{p1}$ 100 in the main loop and the output $y_2(t)$ of the process $G_{p2}$ 104 in the disturbance loop at adder 108.

A traditional feedforward controller is designed based on the so called Invariant Principle. That is, with the measured disturbance signal, the feedforward controller is able to affect the loop response to the disturbance only. It does not affect the loop response to the setpoint change.

The control objective for the feedforward controller is to compensate for the measured disturbance. That is, it is desirable to have $$G_f(S) = \frac{Y(S)}{D(S)} = 0, \tag{52}$$

where $G_f(S)$ is the Laplace transfer function of the feedforward loop, and Y(S) and D(S) are the Laplace transform of process variable y(t) and measured disturbance d(t), respectively.

Then, the feedforward controller can be designed as $$G_{fc}(S) = -\frac{G_{p2}(S)}{G_{p1}(S)}, \tag{53}$$

where $G_{fc}(S)$ is the Laplace transfer function of the feedforward controller.

Feedforward compensation can be as simple as a ratio between two signals. It could also involve complicated energy or material balance calculations. In any case, the traditional feedforward controller is based on precise information of process $G_{p1}$ and $G_{p2}$. If the process models are not accurate or the process dynamics change, a conventional feedforward controller may not work properly and even generate worse results than a system that does not employ a feedforward controller.

When a Model-Free Adaptive controller is used in the feedback loop, the feedforward controller can be less sensitive to the accuracy of the process models. An MFA controller's adaptive capability makes conventional control methods easier to implement and more effective. There are two methods to construct a feedforward/feedback model-free adaptive control system as introduced in the following.

1. Compensation Method

The control structure used in this method is the same as the feedforward/feedback control system illustrated in FIG. 9, in which a model-free adaptive controller 98 is used as the feedback controller. If the user does know $G_{p1}(S)$ and $G_{p2}(S)$, a feedforward controller can be designed based on Equation (53). However, in process control applications, especially in the applications where model-free adaptive control is used, the processes $G_{p1}$ and $G_{p2}$ are most likely unknown or have dynamics that change frequently. It is difficult under those circumstances to design a feedforward controller based on the invariant principle. Due to the adaptive capability of the model-free adaptive controller in the feedback loop, we can design a feedforward controller with a first-order dynamic block as follows.

$$G_{fc}(S) = \frac{Y_f(S)}{D(S)} \tag{54}$$

$$= \frac{K_{sf} K_{cf}}{T_{cf} S + 1},$$

where $Y_f(S)$ and D(S) are the Laplace transform of signals $y_f(t)$ and d(t); and $K_{cf}$ is the feedforward gain and $T_{cf}$ is the feedforward time constant. $K_{sf}$ is the feedforward sign factor, which is selected based on the acting types of the sub-processes as follows:

$$K_{sf}=1, \text{ if } G_{p1} \text{ and } G_{p2} \text{ have different acting types} \tag{55a}$$

$$K_{sf}=-1, \text{ if } G_{p1} \text{ and } G_{p2} \text{ have the same acting type} \tag{55b}$$

where we assume the acting types of $G_{p1}$ and $G_{p2}$ are known. Based on the methodology of model-free adaptive control, the feedforward controller only needs to produce a signal based on the measured disturbance to help the control system compensate for the disturbance. That means, no Invariant Principle based design for the feedforward controller is needed. The user can select the constants of $K_{cf}$ and $T_{cf}$ based on the basic understanding of the process. The system can also be fine tuned by adjusting the constants.

2. Prediction Method

Figure 10:
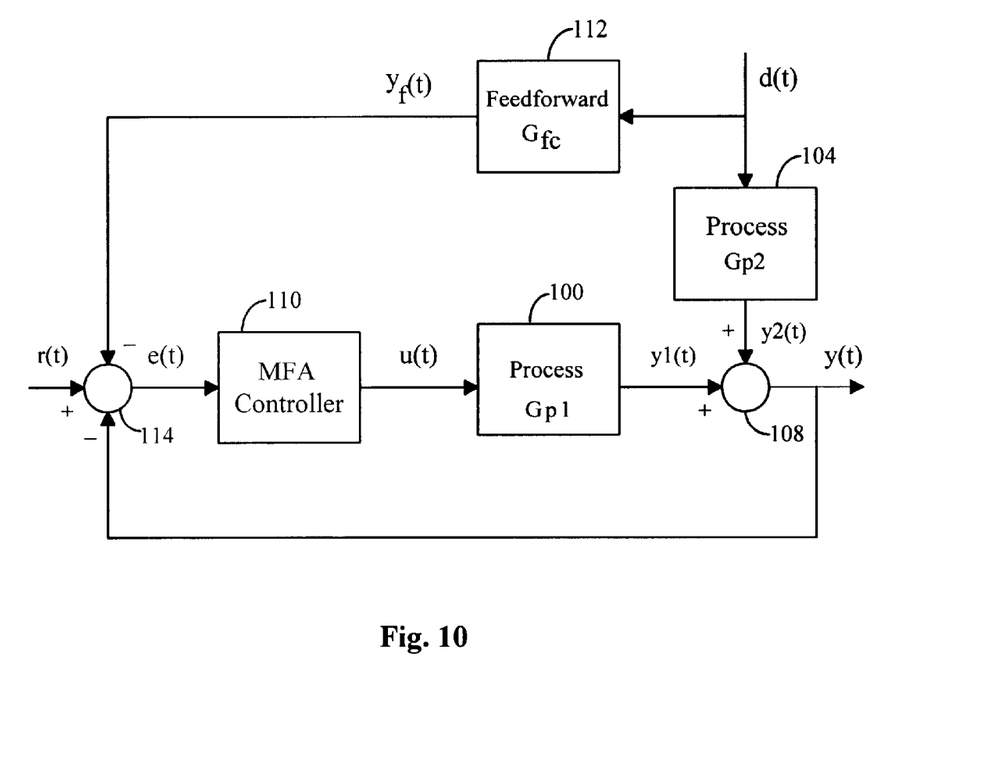
FIG. 10 is a block diagram illustrating a predictive feedforward/feedback model-free adaptive control system according to this invention.

FIG. 10 shows a block diagram of a model-free adaptive control system with a feedforward predictor 112. The input to controller 110 is calculated through adder 114 as $$e(t)=r(t)-y(t)-y_f(t), \tag{56}$$

where $y_f(t)$ is the output of the feedforward predictor.

The idea here is to feed the forward signal directly to the input of the feedback controller to produce an e(t) signal for the controller so that the disturbance can be rejected right away. Again, this design depends on the adaptive capability of the model-free adaptive controller. If a traditional controller like PID is used, this design will not work.

The feedforward predictor can be designed in a simple form without knowing the quantitative information of the process. For instance, it can be designed in a generic first-order-lag form represented by the following Laplace transfer function:

$$G_f(S) = \frac{Y_f(S)}{D(S)} \tag{57}$$

$$= K_s K_f \left(1 - \frac{1}{T_{cf}S + 1}\right),$$

where $Y_f(S)$ and $D(S)$ are the Laplace transform of signals $y_f(t)$ and $d(t)$; $K_f>0$ is the feedforward predictor gain; $T_{cf}>0$ is the feedforward predictor time constant; and $K_s$ is the predictor sign factor, which is selected based on the acting types of the sub-processes as follows:

$$K_s=1, \text{ if } G_{p2} \text{ is direct acting} \tag{58a}$$

$$K_s=-1, \text{ if } G_{p2} \text{ is reverse acting} \tag{58b}$$

Figure 11:
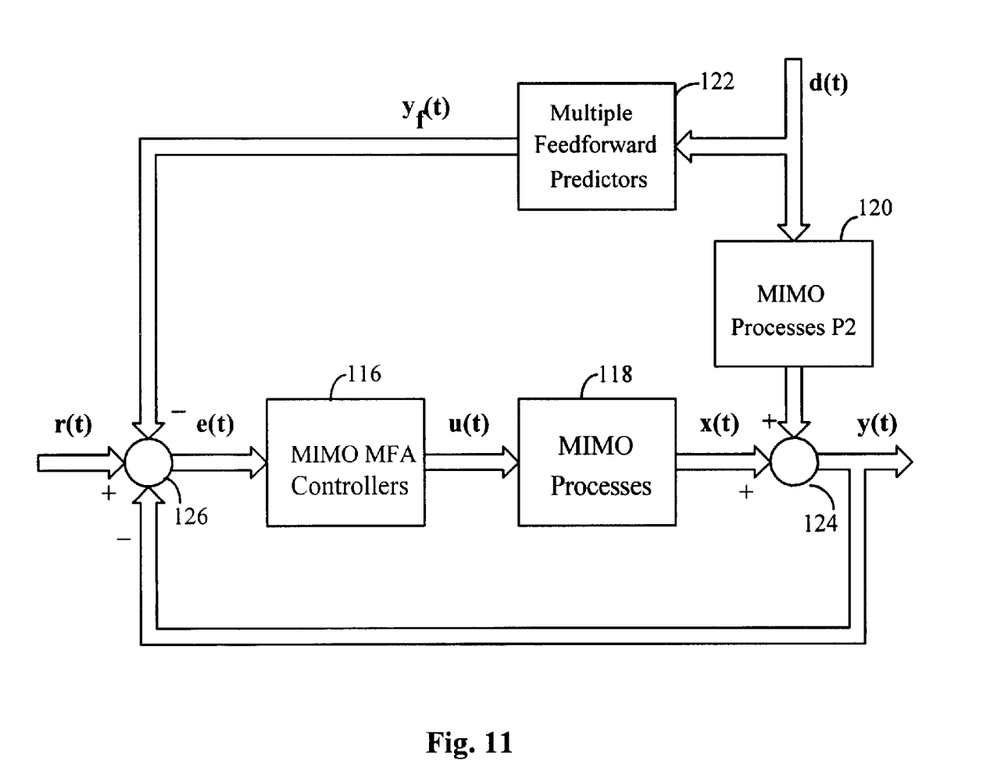
FIG. 11 is a block diagram illustrating an M×M multivariable model-free adaptive control system with multiple feedforward predictors.

Without losing generality, FIG. 11 illustrates an M×M multivariable model-free adaptive control system with multiple feedforward predictors 122. Each main controller 116 can have none to several feedforward predictors depending on its measurable disturbances. This design can be applied to other MFA control systems such as anti-delay, cascade, etc.

What is claimed is:

1. A controller for a process having a process output which is controlled by a control signal applied to an input of said process, said controller including a neural network comprising:

a) an error input representative of the difference between a predetermined setpoint and said process output;

b) a normalization unit for normalizing said error input to a predetermined range of values;

c) a scaling function for scaling said normalized error input to produce a value $E_1$ of the form $$E_1 = \frac{K_c}{T_c} N(e(t)),$$

or an equivalent thereof, in which $K_c$ is the controller gain; $T_c$ is the user-selected time constant of said process; $N(.)$ is the normalization function of said normalization unit; and $e(t)$ is the value of said error input at any given time;

d) a layer of input neurons having as their inputs successively time-delayed values of $E_1$;

e) a layer of hidden neurons each having as its output the sum of individually weighted ones of said successively time-delayed values of $E_1$;

f) an output neuron having as its output the sum of a first function of the individually weighted outputs of said hidden neurons; and g) a control output which is at least in part the denormalized value of a second function of the output of said output neuron.

2. The controller of claim 1, in which said control output is the sum of said denormalized value and the value $K_c e(t)$, or an equivalent thereof.

3. The controller of claim 1, in which said first and second functions are both of the form $$f(x)=0, \text{ if } x<-b/a$$

$$f(x)=ax+b, \text{ if } -b/a \leq x \leq b/a$$

$$f(x)=1, \text{ if } x>b/a$$

or-an equivalent thereof, wherein a is an arbitrary constant and b=½.

4. A controller for a process having a process output which is controlled by a control signal applied to an input of said process, said controller comprising:

a) an error input connected to receive an error signal representative of the difference between a predetermined setpoint signal and said process output; and b) a dynamic neural network connected to said error input and arranged to produce a control signal for application to said process input, said control signal being such as to cause said process output to change and thereby reduce said error signal;

c) said neural network having a piecewise linear activation function.

5. The controller of claim 4, in which said controller is a computer program embodied in a digital medium.

6. The controller of claim 4, in which said piecewise linear activation function f(x) is of the form $$f(x)=0, \text{ if } x<-b/a$$

$$f(x)=ax+b, \text{ if } -b/a \leq x \leq b/a$$

$$f(x)=1, \text{ if } x>b/a$$

or an equivalent thereof, wherein a is an arbitrary constant and b=½.

7. The controller of claim 6, in which said neural network has an input layer including a plurality of input neurons arranged to receive normalized, scaled and delayed forms of said error signal, a hidden layer including a plurality of hidden neurons each arranged to sum the signals received by each of said input neurons weighted by an individual first weighting factor, an output layer including a single neuron arranged to sum the output of said hidden neurons filtered through said activation function and weighted by individual second weighting factors, and a control signal output which is a function of the output of said output neuron, said first and second weighting factors, respectively, being iteratively modified in accordance with the formulae $$\Delta w_{ij}(n) = a^2 \eta \frac{\partial y(n)}{\partial u(n)} e(n) E_i(n) h_j(n),$$

$$\Delta h_j(n) = a \eta \frac{\partial y(n)}{\partial u(n)} e(n) q_j(n),$$

or equivalents thereof, wherein $\Delta w_{ij}(n)$ is the iterative change in the weighting factor for the signal from a given input neuron to a given hidden neuron, $\Delta h_j(n)$ is the iterative change in the weighting factor for the output of said given hidden neuron, a is the arbitrary constant of the activation function f(x), η is the learning rate, $\partial y(t)/\partial u(t)$ is the gradient of the variation of said process output with respect to a variation in said control signal, e(n) is the raw error signal, $E_i(n)$ is the normalized and scaled error signal at the ith input neuron, $h_j$ is the weighting factor for the output of said given hidden neuron, and $q_j(n)$ is the output of said given hidden neuron filtered by said activation function.

8. A multivariable model-free adaptive process control system, comprising:

a) a plurality of processes, each process having a first process output responsive to a control signal and a sub-process having an output which is additively combined with said first process output of another of said plurality of processes to form a second process output of said other process;

b) a plurality of predetermined setpoints;
c) a plurality of controllers;
d) a plurality of compensators;
e) each of said controllers having an iteratively adjusted first control output which is a function of an error signal representing the difference between said second process output of one of said plurality of processes and a corresponding one of said setpoints;
f) each said compensator having said first control output of a corresponding controller as its input, the output of said compensator being additively combined with said first control output of another of said controllers to form a second control output which is the input to one each of said processes and sub-processes;
g) said controllers each including a neural network with an input layer including a plurality of input neurons arranged to receive normalized, scaled and delayed forms of said error signal, a hidden layer including a plurality of hidden neurons each arranged to sum the signals received by each of said input neurons weighted by an individual first weighting factor, and an output neuron which sums the individually weighted outputs of hidden neurons, the weighting factors for said hidden neuron outputs being iteratively adjusted, and an activation function f(x) of the form $f(x)=0$, if $x<-b/a$ $f(x)=ax+b$, if $-b/a \leq x \leq b/a$ $f(x)=1$, if $x>b/a$ or an equivalent thereof, wherein a is an arbitrary constant and b=½;
h) each said controller being arranged to produce a control signal u(n) which is the sum of the output v(n) of said neural network and the outputs of all the compensators associated with the other said controllers, v(n) being of the form $$v(n) = K_c e(n) + 100\left[a\sum_{j=1}^{N} h_j(n)q_j(n) + b\right],$$

or an equivalent thereof, in which $K_c$ is the controller gain; e(n) is said error signal; $h_j(n)$ is the weighting factor for the jth hidden neuron output; and $q_j(n)$ is the jth hidden neuron output; and
i) each of said compensators having an input-output relationship of the form $$C(S) = \frac{K_s K_c}{T_c S + 1},$$

or an equivalent thereof, in which $K_s$ is a sign factor, $K_c$ is the compensator gain, $T_c$ is the compensator time constant, and S is the Laplace transform operator.

9. The system of claim 8, in which $K_s$ is 1 if said other process and said sub-process have different acting types, and −1 if they have the same acting type.

10. A multivariable model-free adaptive predictive control system, comprising:
a) a plurality of processes, each process having a first process output responsive to a control signal and a sub-process having an output which is additively combined with said first process output of another of said plurality of processes to form a second process output of said other process;
b) a plurality of predetermined setpoints;
c) a plurality of controllers;
d) a plurality of predictors;
e) each of said controllers having an iteratively adjusted first control output which is a function of an error signal representing the difference between said second process output of one of said plurality of processes plus the outputs of said plurality of predictors, and a corresponding one of said setpoints;
f) said controllers each including a neural network with an input layer including a plurality of input neurons arranged to receive normalized, scaled and delayed forms of said error signal, a hidden layer including a plurality of hidden neurons each arranged to sum the signals received by each of said input neurons weighted by an individual first weighting factor, and an output neuron which sums the individually weighted outputs of hidden neurons, the weighting factors for said hidden neuron outputs being iteratively adjusted, and an activation function f(x) of the form $f(x)=0$, if $x<-b/a$ $f(x)=ax+b$, if $-b/a \leq x \leq b/a$ $f(x)=1$, if $x>b/a$ or an equivalent thereof, wherein a is an arbitrary constant and b=½;
g) each said controller being arranged to produce a control signal u(n) of the form $$u(n) = K_c e(n) + 100\left[a\sum_{j=1}^{N} h_j(n)q_j(n) + b\right],$$

or an equivalent thereof, in which $K_c$ is the controller gain; e(n) is said error signal; $h_j(n)$ is the weighting factor for the jth hidden neuron output; and $q_j(n)$ is the jth hidden neuron output; and
h) each of said predictors having as its input the output of a controller associated with another of said predictors, and having an input-output relationship of the form $$C(S) = K_s K_c\left(1 - \frac{1}{T_c S + 1}\right),$$

or an equivalent thereof, in which $K_s$ is a sign factor, $K_c$ is the predictor gain, $T_c$ is the predictor time constant, and S is the Laplace transform operator.

11. The system of claim 10 in which said plurality of processes includes first and second processes, said first and second processes having, respectively, first and second sub-processes; the process outputs of said first and second processes being responsive, respectively, to first and second control signals generated, respectively, by first and second ones of said plurality of controllers; said plurality of predictors includes first and second predictors, the input of said first predictor being said first control signal; and the input of said second predictor being said second control signal; $K_s$ of said first predictor is 1 if said second sub-process is direct acting and −1 if it is reverse acting; and $K_s$ of said second predictor is 1 if said first sub-process is direct acting and −1 if it is reverse acting.

12. A feedforward-feedback process control system, comprising:
   a) a process to be controlled;
   b) a sub-process representing a known disturbance to the output of said process;
   c) a model-free adaptive controller having an error input and a control output arranged to control said process; and
   d) a model-free adaptive feedforward controller having said disturbance as its input and arranged to produce a feedforward signal which is a function of said disturbance;
   e) said feedforward signal being connected to modify said control output.

13. The system of claim 12, in which said model-free adaptive feedforward controller has an input-output relationship of the form $$G_{fc}(S) = \frac{K_{sf} K_{cf}}{T_{cf} S + 1},$$

or an equivalent thereof, in which $K_{cf}$ is the feedforward gain; $T_{cf}$ is the feedforward time constant; $K_{sf}$ is the feedforward sign factor, S is the Laplace operator, and said feedforward signal is added to said control output.

14. The system of claim 13, in which $K_{sf}$ is 1 if said process and said sub-process have different acting types, and −1 if they have the same acting type.

15. The system of claim 12, in which said feedforward controller is a predictor, and said feedforward controller has an input-output relationship of the form $$G_f(S) = K_s K_f \left(1 - \frac{1}{T_{cf} S + 1}\right),$$

or an equivalent thereof, wherein $K_s$ is the predictor sign factor, $K_f$ is the predictor gain, $T_{cf}$ is the predictor time constant, and S is the Laplace transform operator, said feedforward signal being added to said input of said model-free adaptive controller.

16. The system of claim 15, in which $K_s$ is 1 if said sub-process is direct acting, and −1 if said sub-process is reverse acting.

17. A process control system for handling large time delays, comprising:
   a) a process having a process input and a process output, said output responding to said process input with a large time delay;
   b) a model-free adaptive controller having an error input which is the difference between a predetermined setpoint and a first function of said process output; said controller further having a control output which is applied to said process as said process input; and
   c) a delay predictor which has as its inputs said control output and a second function of said process output, said first function of said process output being the output of said delay predictor;
   d) said output of said delay predictor being subtractively applied to said setpoint to produce said error input.

18. The system of claim 17, in which said output of said delay predictor is of the form $$Y_c(S) = Y(S) + \frac{K(1 - e^{-\tau S})}{TS + 1} U(S),$$

or an equivalent thereof, wherein Y(S), U(S), and $Y_c(S)$ are the Laplace transform of signals y(t), u(t) and $y_c(t)$, respectively; y(t) is the said second function of process output, u(t) is the said control output, and $y_c(t)$ is the said output of the delay predictor; K, T, τ being the parameters for the predictor, the value of K being set as $K=1/K_c$ or an equivalent there of, wherein $K_c$ is the controller gain of said controller, the value of T being set as the estimated process time constant of said process, and the value of τ being set as the estimated process delay time of said process.

* * * * *